United States Patent Office 2,766,241
Patented Oct. 9, 1956

2,766,241

ISOALLOXAZINES

Harold George Petering, Kalamazoo, Mich., assignor to The Upjohn Company, Kalamazoo, Mich., a corporation of Michigan No Drawing. Application April 17, 1953,
Serial No. 349,571

27 Claims. (Cl. 260—251.5)

This invention relates to new and useful compositions of matter, and is more particularly directed to [ω-formylalkyl]-isoalloxazines, derivatives thereof, and to a method for the preparation of these compounds.

This application is a continuation-in-part of my pending application Serial No. 260,779, filed December 8, 1951, now abandoned.

The [ω-formylalkyl]-isoalloxazines of the invention are represented by the following general formula:

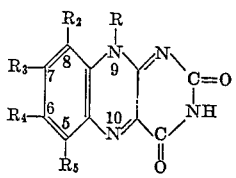

wherein R is an ω-formylalkyl group containing from two to six carbon atoms inclusive, $R_2$ and $R_5$ are members selected from the group consisting of hydrogen, lower-alkyl, lower-alkoxy, and amino, and $R_3$ and $R_4$ are members selected from the group consisting of hydrogen, methylene groups linked together to form a carbocyclic ring having from five to six carbon atoms, inclusive, lower-alkyl, lower-alkoxy, halo, and amino, and wherein $R_2$, $R_3$, $R_4$ and $R_5$ when taken together include not more than one amino group, and the hydrates, hydrazones, semicarbazones, thiosemicarbazones, and oximes of said formylalkylisoalloxazines.

It is an object of the present invention to provide novel compounds and derivatives thereof. Another object of this invention is to provide a process for the preparation of these new compounds. Other objects of the invention will be apparent to those skilled in the art to which this invention pertains.

These new and novel compounds are useful as antifungal agents. In addition, the [ω-formylalkyl]-isoalloxazines and derivatives thereof possess anti-metabolite properties; for example, they are competitively active riboflavin antagonists.

The [ω-formylalkyl]-isoalloxazines of the present invention are obtained by reacting a polyhydroxyalkyl-isoalloxazine of the formula:

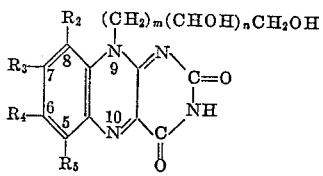

wherein $R_2$, $R_3$, $R_4$ and $R_5$ are as defined above, m is an integer from one to five inclusive, and n is an integer from one to four inclusive, with not more than 2.5 times n equivalents of oxidizing agent per mole of polyhydroxyalkylisoalloxazine, to produce the corresponding [ω-formylalkyl] - isoalloxazine. The hydrazones, semicarbazones, thiosemicarbazones and oximes are prepared by reacting the [ω-formylalkyl]-isoalloxazine thus-obtained with a reagent selected from the group consisting of hydrazine, semicarbazide, thiosemicarbazide and hydroxylamine.

The terms lower-alkyl and lower-alkoxy as used herein include alkyl and alkoxy groups containing from one to five carbon atoms inclusive. The term equivalents refers to the molecular weight of the oxidizing agent divided by the total valence change of the oxidizing agent involved in the reaction. Suitable oxidizing agents include periodic acid, lead tetraacetate, and the like.

According to the preferred procedure for the preparation of an [ω-formylalkyl]-isoalloxazine of the invention, the starting polyhydroxyalkylisoalloxazine is suspended in an acid medium such as sulfuric acid, phosphoric acid, acetic acid, or the like, and the suspension reacted, at a temperature maintained between about zero degree centigrade and about fifty degrees centigrade and preferably, not above 25 degrees centigrade, with an oxidizing agent such as periodic acid, lead tetraacetate, or the like. Upon completion of the reaction, the pH of the reaction mixture is adjusted to the isoelectric point of the [ω-formylalkyl]-isoalloxazine thus-produced, thereby precipitating the [ω-formylalkyl]-isoalloxazine. The solid [ω-formylalkyl]-isoalloxazine is removed by filtration or other suitable procedure, washed with solvents such as water, organic water-miscible solvents such as acetone, methanol, ethanol, or the like, and dried to obtain the desired material in substantially pure form.

The [ω-formylalkyl]-isoalloxazine prepared by the aforedescribed procedure and subsequently isolated from the reaction mixture can be used in the preparation of its derivatives. It is also feasible to use the reaction mixture, which has been freed or partially freed of the [ω-formylalkyl]-isoalloxazine, in the preparation of derivatives, as hereinafter described, which are readily removable from the ultimate reaction mass.

The [ω-formylalkyl]-isoalloxazine, or the reaction mixture containing this material, can thus be reacted with hydroxylamine, semicarbazide, thiosemicarbazide, hydrazine, or substituted hydrazines, such as, for example, phenylhydrazine, 2,4-dinitrophenylhydrazine, and the like, according to well-established procedures, to produce novel derivatives of the aldehyde compound.

In a more specific embodiment of this invention, a typical and preferred [ω-formylalkyl]-isoalloxazine of the invention, such as 6,7-dimethyl-9-formylmethylisoalloxazine, otherwise referred to as 6,7-dimethyl-9-isoalloxazineacetaldehyde, is obtained by reacting a 6,7-dimethyl-9-polyhydroxyalkylisoalloxazine, for example, a glycitylisoalloxazine where n is three, such as riboflavin (otherwise referred to as 6,7-dimethyl-9-(1'-D-ribityl)-isoalloxazine), or 6,7-dimethyl-9-(1'-D-arabityl)-isoalloxazine or 6,7-dimethyl-9-(1'-D-lyxityl)-isoalloxazine, or the like, with not more than 7.5 equivalents of an oxidizing agent and preferably between about 6.0 and 7.0 equivalents of oxidizing agent per mole of 6,7-dimethyl-9-polyhydroxyalkylisoalloxazine.

If the ultimate derivative, i. e., the hydrazone, semicarbazone, thiosemicarbazone or oxime, rather than the free 6,7-dimethyl-9-formylmethylisoalloxazine is to be prepared, an amount equal to two times n equivalents of oxidizing agent per mole of polyhydroxyalkylisoalloxazine is adequate. Lesser amounts of oxidizing agent up to those indicated may also be used. If a 6,7-dimethyl-9-polyhydroxyalkylisoalloxazine such as 6,7-dimethyl-9-(1'-D-sorbityl)-isoalloxazine, otherwise referred to as galactoflavin, 6,7 - dimethyl-9-(1' - D - dulcityl)-isoalloxazine, otherwise referred to as glucoflavin, or the like, is used, wherein n has a value of four, not more than 10.0 equivalents of oxidizing agent are used.

The starting polyhydroxyalkylisoalloxazines are prepared by various known methods. For example, in one method, a polyhydroxyalkylisoalloxazine is obtained by subjecting an N-mono-substituted aromatic ortho-diamine to condensation with an alloxan compound (Kuhn, Ber., 67, 1939, 1934; Karrer, Helv. Chim. Acta, 18, 69, 1935). The condensation of the N-monosubstituted aromatic ortho-diamine with alloxan or N-monosubstituted products thereof to produce the isoalloxazine is preferably performed in acid solution, for instance, in the presence of mineral acids such as hydrochloric, hydrobromic, sulfuric, nitric and phosphoric acid; but the condensation may also be carried out in a strong acetic acid solution, preferably by mixing the N-polyhydroxyalkyl aromatic ortho-diamine with a suspension of alloxan monohydrate and boric acid in glacial acetic acid, the isoalloxazine thus-formed usually precipitating from the reaction mixture in substantially pure form.

Instead of using an N-monosubstituted aromatic ortho-diamine in the above-described condensation process, an N-monosubstituted aromatic ortho-nitroamine may be used as the starting material. The reduction of the ortho-nitroamine to the corresponding diamine and the condensation of the diamine thus-produced with alloxan may be carried out in a single step if the N-monosubstituted aromatic ortho-nitroamine is reacted with the alloxan compound in the presence of a reducing agent. A leuco compound of the isoalloxazine compound is formed which is subsequently dehydrogenated by treatment with a dehydrogenating agent. Reducing agents which can be used include tin, stannous chloride, iron, trivalent titanium, and the like. Suitable dehydrogenating agents such as oxygen, potassium permanganate, halogens, quinoid dyestuffs, and the like, may be used.

Isoalloxazines are also prepared by reaction of ortho-aminoarylazo compounds or ring-substituted (i. e., alkyl, alkoxy, halo, amino groups, and the like) ortho-aminoarylazo compounds with barbituric acid in an acid medium (U. S. Patent 2,261,608).

Ortho-aminoarylazo compounds may also be condensed with alloxantin or dialuric acid to produce isoalloxazines in accordance with the procedure disclosed in U. S. Patent 2,374,661.

The starting aminoazo compounds are conveniently prepared by the coupling of substituted phenylamines containing alkyl, alkoxy, halo groups, and the like, with a diazotized amine in the manner described by Karrer, Helv. Chim. Acta, 18, 1130, 1935; 19, 264, 1936.

In another method used in the synthesis of isoalloxazines, the need for the above-indicated aminoazo compounds is eliminated since N-substituted aromatic amines such as ribityl or arabityl xylidine, and the like, or mineral salt thereof such as the hydrochlorides, and the like, can be condensed directly with voluric acid to yield isoalloxazines in a single step.

In another method, polyhydroxylated alkyl nitriles or their aryl derivatives may be reductively condensed with an aromatic amine to form the corresponding N-polyhydroxylated alkylamine, or the acylated N-polyhydroxylated alkylamine, which may be coupled with a diazonium salt, the resulting compound reduced to form the corresponding diamine and the diamine thus-obtained condensed with alloxan to form an isoalloxazine (U. S. Patent 2,261,608).

The various 6,7-dialkyl-9-polyhydroxyalkylisoalloxazines which are used in the preparation of the preferred 6,7-dialkyl-9-[ω-formylalkyl]-isoalloxazines of the invention may also be obtained according to the method of Karrer et al., Helv. Chim. Acta, 17, 1165, 1516 (1934).

A typical polyhydroxyalkylisoalloxazine, riboflavin, otherwise referred to as 6,7-dimethyl-9-(1'-D-ribityl)-isoalloxazine, was synthesized by Karrer, Helv. Chim. Acta, 18, 522–35, 1935, and Kuhn, Ber., 68, 1765–74, 1935. The basis of both the Kuhn and Karrer processes is the condensation of N-(3,4-dimethyl-6-aminophenyl)-D-ribamine with alloxan to yield riboflavin. Karrer carries out this condensation in acid solution (U. S. Patents 2,155,555 and 2,237,074), whereas Kuhn materially increases the yield of that condensation by effecting it in glacial acetic acid solution with the use of boric acid as a catalyst (U. S. Patent 2,238,874 and Ber., 68, 1282, 1935). The N-(3,4-dimethyl-6-aminophenyl)-D-ribamine required for this condensation with alloxan is prepared by conventional methods such as: (1) condensation of 4,5-dinitro-o-xylene with D-ribamine followed by catalytic reduction of the product thus-obtained in aqueous alcoholic solution (Kuhn and Weygand, Ber., 68, 1001, 1935); or (2) condensation of 3,4-dimethyl-6-nitroaniline with D-ribose and reduction of the product thus-obtained (Kuhn et al., Ber., 68, 1765, 1935; 70, 773, 1937); or (3) condensation of 3,4-dimethyl-6-carbethoxyamino-aniline (Karrer et al., Helv. Chim. Acta, 18, 69, 1935; 18, 426, 1935) or 3,4-dimethyl-6-acetylaminoaniline (Karrer et al., Ber., 68, 216, 1935) with D-ribose, reduction and saponification of the resulting compound to obtain the free amine, N-(3,4-dimethyl-6-aminophenyl)-D-ribamine; or (4) condensation of 3,4-dimethylaniline with D-ribose, catalytic reduction of the resulting riboside to N-(3,4-dimethylphenyl)-D-ribamine, coupling thereof with an aryl diazonium salt to form the N-(3,4-dimethyl-6-arylazophenyl)-D-ribamine and reduction of the compound thus-produced to form N-(3,4-dimethyl-6-aminophenyl)-D-ribamine. (Karrer et al., Helv. Chim. Acta, 18, 1435, 1935).

Using the last-described procedure, other isoalloxazines, including those containing substituents in the 5, 6, 7 and 8 positions, may likewise be prepared. Thus, the starting polyhydroxyalkylisoalloxazines and intermediates used in the preparation of the [ω-formylalkyl]-isoalloxazines of the invention may be obtained by any of the procedures described supra or other conventional methods disclosed in the art.

The following examples are illustrative of the process and products of this invention and are not to be construed as limiting.

*Example 1.—6,7-dimethyl-9-formylmethylisoalloxazine and its hydrate*

A suspension of 5.7 grams (0.015 mole) of 6,7-dimethyl-9-(1'-D-ribityl)-isoalloxazine (Karrer et al., Helv. Chim. Acta, 17, 1516, 1934) in 150 milliliters of 2.0 normal sulfuric acid is prepared. The suspension is cooled to a temperature of five degrees centigrade and a solution of 12.6 grams (0.055 mole) of hydrated periodic acid ($HIO_4 \cdot 2H_2O$) in ninety milliliters of water is added thereto and the mixture stirred, while cooled in an ice-bath, for about one hour until a clear solution is obtained. At this point, the acidity of the solution is adjusted to a pH of about 1.5 by the addition of solid sodium carbonate. One and one half grams of activated carbon are added and the mixture is stirred for thirty minutes at room temperature. The carbon and the unreacted 6,7-dimethyl-9-(1'-D-ribityl)-isoalloxazine adsorbed thereon are removed by filtration and solid sodium carbonate added to the filtrate until a copious precipitate is formed; at this point, the pH of the mixture is about 3.8. The precipitate is separated by centrifuging and washed successively with 100 milliliters of water, fifty milliliters of water, 100 milliliters of alcohol and fifty milliliters of alcohol, the separation of the solid being effected by centrifuging after each washing. After the last washing, the product is suspended in fifty milliliters of alcohol, filtered and dried in a vacuum desiccator over phosphorus pentoxide. The yellow-orange 6,7-dimethyl-9-formylmethylisoalloxazine monohydrate weighs 3.4 grams (75 percent yield) and has a melting point of 258 to 259 degrees centigrade (uncorrected) with decomposition and previous darkening. On removal of one molecule of water from the hydrate by heating, 6,7-dimethyl-9-formylmethylisoalloxazine is obtained.

*Analysis.*—Calculated for $C_{14}H_{12}N_4O_3 \cdot H_2O$: C, 55.6; H, 4.6; N, 18.5. Found: C, 56.0; H, 4.4; N, 18.2.

Example 2.—6,7-dimethyl-9-formylmethylisoalloxazine thiosemicarbazone

To a suspension of three grams (0.01 mole) of 6,7-dimethyl-9-formylmethylisoalloxazine monohydrate (Example 1) in 200 milliliters of water is added glacial acetic acid until solution thereof is obtained. A solution of two grams of thiosemicarbazide in 100 milliliters of water is added and the mixture shaken vigorously for several minutes. After chilling the mixture to about four degrees centigrade in a refrigerator, the solid material thus-formed is separated by centrifuging and washed successively with 100 milliliters of alcohol and 100 milliliters of water, the solid being centrifugally separated after each washing. After another washing with 100 milliliters of alcohol, the product is separated by filtration, washed with a small amount of ether and dried in a vacuum desiccator. There is obtained 2.65 grams (74 percent yield) of an orange colored crystalline material, 6,7 - dimethyl - 9-formylmethylisoalloxazine thiosemicarbazone, melting at 232 to 233 degrees centigrade (uncorrected) with decomposition and previous darkening.

*Analysis.*—Calc. for $C_{15}H_{15}O_2N_7S$: C, 50.4; H, 4.2; N, 27.5; S, 8.96. Found: C, 50.6; H, 4.5; N, 26.4; S, 9.0.

The hydrazones and the semicarbazones of 6,7-dimethyl-9-formylmethylisoalloxazine are prepared in the same manner using stoichiometric amounts of a hydrazine, illustratively hydrazine, phenylhydrazine, or 2,4-dinitrophenylhydrazine, or semicarbazide in place of the thiosemicarbazide of the above example.

Example 3.—6,7-dimethyl-9-formylmethylisoalloxazine thiosemicarbazone

Eight grams of lead tetraacetate (0.0180 mole) dissolved in fifty milliliters of warm glacial acetic acid, is added, with stirring, to a solution of two grams (0.0055 mole) of 6,7-dimethyl-9-(1'-D-ribityl)-isoalloxazine (Example 1) in fifty milliliters of 0.1 normal sodium hydroxide. After standing at room temperature, a deep green fluorescence appears in the mixture at which time ten drops of concentrated sulfuric acid are added and the resulting lead sulfate precipitate removed by centrifuging. The 6,7-dimethyl-9-formylmethylisoalloxazine is precipitated from the solution by reducing the acidity thereof to a pH of about 3.2 and then removed by filtration.

The 6,7 - dimethyl - 9-formylmethylisoalloxazine thus-obtained is reacted with one gram of thiosemicarbazide until a heavy red precipitate is formed. The solid material is removed and successively washed with water, alcohol and ether. A yield of 1.35 grams of 6,7-dimethyl-9-formylmethylisoalloxazine thiosemicarbazone is obtained.

Example 4.—6,7-dimethyl-9-formylmethylisoalloxazine oxime

To a suspension of 250 milligrams of 6,7-dimethyl-9-formylmethylisoalloxazine monohydrate (Example 1) in 200 milliliters of water is added glacial acetic acid until solution thereof is obtained. (This occurs at a pH of about 2.3.) A solution of 200 milligrams of hydroxylamine hydrochloride in ten milliliters of water, adjusted to a pH of about 6.7 by the addition of solid sodium carbonate, is mixed with the aqueous solution of 6,7-dimethyl-9-formylmethylisoalloxazine and the resulting mixture shaken vigorously and allowed to stand overnight at room temperature while protected from light. The yellow precipitate thus-formed is separated by centrifuging, washed three times with twenty milliliter portions of alcohol, the solid being centrifugally separated after each washing, and finally dried in a vacuum desiccator. The 6,7 - dimethyl - 9-formylmethylisoalloxazine oxime thus-obtained melts at about 260 degrees centigrade with decomposition and previous darkening.

*Analysis.*—Calculated for $C_{14}H_{13}O_3N_5$: C, 5.62; H, 4.35; N, 23.4. Found: C, 56.0; H, 4.35; N, 22.9.

Example 5.—5,6-dimethyl-9-formylmethylisoalloxazine

Following the procedure described in Example 1 except for the substitution of 6,7-dimethyl-9-(1'-D-ribityl)-isoalloxazine by 5.7 grams of 5,6-dimethyl-9-(1'-D-ribityl)-isoalloxazine (Tishler et al., J. Am. Chem. Soc. 69, 1488, 1947) and the replacement of periodic acid by 22.2 grams of lead tetraacetate, 5,6-dimethyl-9-formylmethylisoalloxazine is obtained.

Example 6.—5,6-dimethyl-9-formylmethylisoalloxazine thiosemicarbazone

Following the procedure described in Example 2 except for the substitution of 6,7-dimethyl-9-formylmethylisoalloxazine by 5,6-dimethyl-9-formylmethylisoalloxazine (Example 5). 5,6-dimethyl-9-formylmethylisoalloxazine thiosemicarbazone is obtained.

Example 7.—6-ethyl-7-methyl-9-formylmethylisoalloxazine

Following the procedure described in Example 1 except for the substitution of 6,7-dimethyl-9-(1'-D-ribityl)-isoalloxazine by 5.9 grams of 6-ethyl-7-methyl-9-(1'-D-ribityl)-isoalloxazine (Karrer and Quibell, Helv. Chim. Acta, 19, 1034, 1936), 6-ethyl-7-methyl-9-formylmethylisoalloxazine is obtained.

Example 8.—6-ethyl-7-methyl-9-formylmethylisoalloxazine oxime

Following the procedure described in Example 4 except for the substitution of 6,7-dimethyl-9-formylmethylisoalloxazine by 6-ethyl-7-methyl-9-formylmethylisoalloxazine (Example 7), 6 - ethyl-7-methyl-9-formylmethylisoalloxazine oxime is obtained.

Example 9.—7-methyl-9-formylmethylisoalloxazine

Following the procedure described in Example 1 except for the substitution of 6,7-dimethyl-9-(1'-D-ribityl)-isoalloxazine by 5.4 grams of 7-methyl-9-(1'-D-ribityl)-isoalloxazine (Karrer and Quibell, Helv. Chim. Acta, 19, 1034, 1936), 7-methyl-9-formylmethylisoalloxazine is obtained.

Example 10.—6,7-dimethyl-9-[ω-formylethyl]-isoalloxazine

Following the procedure described in Example 1 except for the substitution of 6,7-dimethyl-9-(1'-D-ribityl)-isoalloxazine by 5.5 grams of 6,7-dimethyl-9-(1'-D-desoxyribityl)-isoalloxazine (Karrer et al., Helv. Chim. Acta, 18, 1144, 1935) and the use of 7.5 grams of periodic acid, 6,7-dimethyl-9-[ω-formylethyl]-isoalloxazine is obtained.

Example 11.—6,7-dimethyl-9-[ω-formylethyl]-isoalloxazine thiosemicarbazone

Following the procedure described in Example 2 except for the substitution of 6,7-dimethyl-9-formylmethylisoalloxazine by 6,7-dimethyl-9-[ω-formylethyl]-isoalloxazine (Example 10), 6,7-dimethyl-9-[ω-formylethyl]-isoalloxazine thiosemicarbazone is obtained.

Example 12.—6,7-dimethoxy-9-formylmethylisoalloxazine

Following the procedure described in Example 1 except for the substitution of 6,7-dimethyl-9-(1'-D-ribityl)-isoalloxazine by 6.1 grams of 6,7-dimethoxy-9-(1'-L-arabityl)-isoalloxazine, 6,7 - dimethoxy-9-formylmethylisoalloxazine is obtained.

Example 13.—6-methyl-7-amino-9-formylmethylisoalloxazine

Following the procedure described in Example 1 except for the substitution of 6,7-dimethyl-9-(1'-D-ribityl)-isoalloxazine by 5.7 grams of 6-methyl-7-amino-9-(1'-D-arabityl)-isoalloxazine (Nishida, Rpts. Sci. Res. Inst., Japan, 25, 323, 1949), 6-methyl-7-amino-9-formylmethylisoalloxazine is obtained.

Example 14.—6,7-diethyl-9-formylmethylisoalloxazine

Following the procedure described in Example 1 except for the substitution of 6,7-dimethyl-9-(1'-D-ribityl)-isoalloxazine by 6.1 grams of 6,7-diethyl-9-(1'-D-ribityl)-isoalloxazine (Lambooy, J. Am. Chem. Soc., 72, 5225, 1950) and the replacement of periodic acid by 22.2 grams of lead tetraacetate, 6,7-diethyl-9-formylmethylisoalloxazine is obtained.

Example 15.—6,7-diethyl-9-formylmethylisoalloxazine thiosemicarbazone

Following the procedure described in Example 2 except for the substitution of 6,7-dimethyl-9-formylmethylisoalloxazine by 6,7-diethyl-9-formylmethylisoalloxazine (Example 14), 6,7-diethyl-9-formylmethylisoalloxazine thiosemicarbazone is obtained.

Example 16.—6-methyl-7-chloro-9-formylmethylisoalloxazine

Following the procedure described in Example 1 except for the substitution of 6,7-dimethyl-9-(1'-D-ribityl)-isoalloxazine by 6.4 grams of 6-methyl-7-chloro-9-(1'-D-sorbityl)-isoalloxazine (Schunk et al., J. Am. Chem. Soc., 74, 4251, 1952) and the use of 15.1 grams of periodic acid, 6-methyl-7-chloro-9-formylmethylisoalloxazine is obtained.

Example 17.—6,7-dimethyl-9-[ω-formylpropyl]-isoalloxazine

Following the procedure described in Example 1 except for the substitution of 6,7-dimethyl-9-(1'-D-ribityl)-isoalloxazine by 5.2 grams of 6,7-dimethyl-9-(4',5'-dihydroxyamyl)-isoalloxazine, 6,7-dimethyl-9-[ω-formylpropyl]-isoalloxazine is obtained.

Example 18.—6-methoxy-7-amino-9-formylmethylisoalloxazine

Following the procedure described in Example 1 except for the substitution of 6,7-dimethyl-9-(1'-D-ribityl)-isoalloxazine by 5.9 grams of 6-methoxy-7-amino-9-(1'-D-ribityl)-isoalloxazine, 6-methoxy-7-amino-9-formylmethylisoalloxazine is obtained.

Example 19.—6,7-tetramethylene-9-formylmethylisoalloxazine

Following the procedure described in Example 1 except for the substitution of 6,7-dimethyl-9-(1'-D-ribityl)-isoalloxazine by 6.0 grams of 6,7-tetramethylene-9-(1'-D-arabityl)-isoalloxazine (Kuhn, Ber., 70, 1307, 1937), 6,7-tetramethylene-9-formylmethylisoalloxazine is obtained.

Example 20.—6-methyl-9-formylmethylisoalloxazine

Following the procedure described in Example 1 except for the substitution of 6,7-dimethyl-9-(1'-D-ribityl)-isoalloxazine by 5.4 grams of 6-methyl-9-(1'-D-ribityl)-isoalloxazine (Karrer et al., Helv. Chim. Acta, 18, 1143, 1935), 6-methyl-9-formylmethylisoalloxazine is obtained.

Example 21.—6,7-dichloro-9-formylmethylisoalloxazine

Following the procedure described in Example 1 except for the substitution of 6,7-dimethyl-9-(1'-D-ribityl)-isoalloxazine by 6.3 grams of 6,7-dichloro-9-(1'-D-ribityl)-isoalloxazine (Kuhn et al., Ber., 76, 1044, 1943), 6,7-dichloro-9-formylmethylisoalloxazine is obtained.

Example 22.—6,8-dimethyl-9-formylmethylisoalloxazine

Following the procedure described in Example 1 except for the substitution of 6,7-dimethyl-9-(1'-D-ribityl)-isoalloxazine by 5.7 grams of 6,8-dimethyl-9-(1'-D-ribityl)-isoalloxazine (Kuhn et al., Ber., 70, 1293, 1937), 6,8-dimethyl-9-formylmethylisoalloxazine is obtained.

Example 23.—6-chloro-9-formylmethylisoalloxazine

Following the procedure described in Example 1 except for the substitution of 6,7-dimethyl-9-(1'-D-ribityl)-isoalloxazine by 5.8 grams of 6-chloro-9-(1'-D-arabityl)-isoalloxazine (Schunk et al., J. Am. Chem. Soc., 74, 4251, 1952), 6-chloro-9-formylmethylisoalloxazine is obtained.

Example 24.—5,6,7,8-tetramethyl-9-formylmethylisoalloxazine

Following the procedure described in Example 1 except for the substitution of 6,7-dimethyl-9-(1'-D-ribityl)-isoalloxazine by 6.1 grams of 5,6,7,8-tetramethyl-9-(1'-L-arabityl)-isoalloxazine and the use of 11.4 grams of periodic acid, 5,6,7,8-tetramethyl-9-formylmethylisoalloxazine is obtained.

Similarly, other [ω-formylalkyl]-isoalloxazines are prepared such as, for example, 9-formylmethylisoalloxazine, 9-[ω-formylethyl]-isoalloxazine, 9-[ω-formylpropyl]-isoalloxazine, 6-methyl-7-ethyl-9-formylmethylisoalloxazine, 6,7-dimethyl-7-propyl-9-formylmethylisoalloxazine, 6,7-dimethyl-9-[ω-formylbutyl]-isoalloxazine, 6,7-dimethyl-9-[ω-formylamyl]-isoalloxazine, 6,7-diethyl-9-[ω-formylethyl]-isoalloxazine, 6,7-diethoxy-9-formylmethylisoalloxazine, 6,7-dipropyl-9-formylmethylisoalloxazine, 6,7-dipropoxy-9-formylmethylisoalloxazine, 6-amino-7-methoxy-9-formylmethylisoalloxazine, 6-methoxy-7-amino-9-[ω-formylethyl]-isoalloxazine, 6,7-dimethoxy-9-[ω-formylmethylethyl]-isoalloxazine, 6-propyl-7-methyl-9-formylmethylisoalloxazine, 6-methyl-7-propyl-9-[ω-formylethyl]-isoalloxazine, 6,7-diamyl-9-formylmethylisoalloxazine, 6-methoxy-7-chloro-9-formylmethylisoalloxazine, 6-methyl-8-isopropyl-9-formylmethylisoalloxazine, 6,7-dibutyl-9-formylmethylisoalloxazine, 6,7-trimethylene-9-formylmethylisoalloxazine, 7,8-dimethyl-9-formylmethylisoalloxazine, 5,6,7-trimethyl-9-formylmethylisoalloxazine, 5,6,7-trimethyl-9-[ω-formylethyl]-isoalloxazine, 5,6,7-trimethyl-8-methoxy-9-formylmethylisoalloxazine, 6,8-dimethoxy-7-methyl-9-formylmethylisoalloxazine, 6-chloro-7,8-dimethyl-9-formylmethylisoalloxazine, 5-methyl-8-isopropyl-9-formylmethylisoalloxazine, 5,7-dimethyl-6-methoxy-9-formylmethylisoalloxazine, 5,8-dimethyl-7-ethoxy-9-formylmethylisoalloxazine, 5,6,8-trimethyl-7-amino-9-formylmethylisoalloxazine, 5,6,7,8-tetramethyl-9-[ω-formylethyl]-isoalloxazine, and the like, and the hydrates, hydrazones, semicarbazones, thiosemicarbazones and oximes of these [ω-formylalkyl]-isoalloxazines.

It is to be understood that the invention is not to be limited to the exact details of operation or exact compounds shown and described, as obvious modifications and equivalents will be apparent to one skilled in the art and the invention is therefore to be limited only by the scope of the appended claims.

I claim:

1. [ω-Formylalkyl]-isoalloxazines represented by the formula:

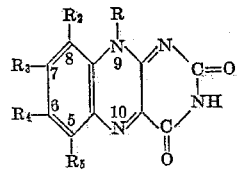

wherein R is an ω-formylalkyl group containing from two to six carbon atoms inclusive, $R_2$ and $R_5$ are members selected from the group consisting of hydrogen and, lower-alkyl, $R_3$ and $R_4$ are members selected from the group consisting of hydrogen, a tetramethylene group linked together to form a carbocyclic ring having six carbon atoms, lower-alkyl, lower-alkoxy, chloro, and amino and wherein $R_2$, $R_3$, $R_4$ and $R_5$ when taken together include not more than one amino group and the hydrates, hydrazones, semicarbazones, thiosemicarbazones, and oximes of said [ω-formylalkyl]-isoalloxazines.

2. Ortho-di-lower-alkyl-9-[ω-formylalkyl]-isoalloxazine.

3. 5,6-di-lower-alkyl-9-[ω-formylalkyl]-isoalloxazine.

4. 5,6-dimethyl-9-[ω-formylakyl]-isoalloxazine.
5. 5,6-dimethyl-9-formylmethylisoalloxazine.
6. 6,7-di-lower-alkyl-9-[ω-formylalkyl]-isoalloxazine.
7. 6 - lower - alkyl - 7 - methyl - 9 - [ω - formylalkyl]-isoalloxazine.
8. 6 - lower - alkyl - 7 - ethyl - 9 - [ω - formylalkyl] - isoalloxazine.
9. 6 - ethyl - 7 - lower - alkyl - 9 - [ω - formylalkyl] - isoalloxazine.
10. 6,7 - dimethyl - 9 - [ω-formylalkyl]-isoalloxazine.
11. 6,7 - di-lower - alkyl - 9 - formylmethylisoalloxazine.
12. 6,7 - di - lower - alkyl - 9 - [ω - formylethyl] - isoalloxazine.
13. 7 - lower - alkyl - 9 - [ω-formylalkyl]-isoalloxazine.
14. 7 - lower - alkyl - 9 - formylmethylisoalloxazine.
15. 7-methyl-9-formylmethylisoalloxazine.
16. 6,7-dimethyl-9-formylmethylisoalloxazine.
17. 6 - ethyl - 7 - methyl - 9 - formylmethylisoalloxazine.
18. 6,7-dimethyl-9-[ω-formylethyl]-isoalloxazine.
19. The process for the preparation of [ω-formylalkyl]-isoalloxazines of the formula:

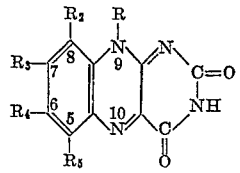

wherein R is an ω-formylalkyl group containing from two to six carbon atoms inclusive, $R_2$ and $R_5$ are members selected from the group consisting of hydrogen and, lower-alkyl, $R_3$ and $R_4$ are members selected from the group consisting of hydrogen, a tetra-methylene group linked together to form a carbocyclic ring having six carbon atoms, lower-alkyl, lower-alkoxy, chloro, and amino and wherein $R_2$, $R_3$, $R_4$ and $R_5$ when taken together include not more than one amino group, which comprises oxidizing a polyhydroxyalkylisoalloxazine of the formula:

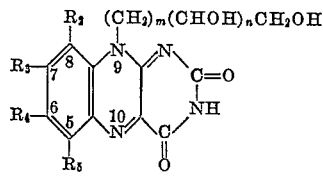

wherein $R_2$, $R_3$, $R_4$ and $R_5$ are as defined above, $m$ is an integer from one to five inclusive, and $n$ is an integer from one to four inclusive, by reaction with up to 2.5 times $n$ equivalents of an oxidizing agent selected from the group consisting of periodic acid and lead tetraacetate per mole of said polyhydroxyalkylisoalloxazine to produce the corresponding [ω-formylalkyl]-isoalloxazine.

20. A process for the preparation of [ω-formylalkyl]-isoalloxazines of the formula:

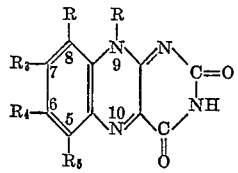

wherein R is an ω-formylalkyl group containing from two to six carbon atoms inclusive, $R_2$ and $R_5$ are members selected from the group consisting of hydrogen and, lower-alkyl, $R_3$ and $R_4$ are members selected from the group consisting of hydrogen, a tetramethylene group linked together to form a carbocyclic ring having six carbon atoms, lower-alkyl, lower-alkoxy, chloro, and amino, and wherein $R_2$, $R_3$, $R_4$ and $R_5$ when taken together include not more than one amino group and formylalkyl group derivatives thereof, which comprises the steps of reacting a polyhydroxyalkylisoalloxazine of the formula:

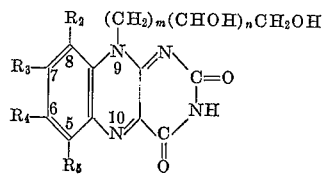

wherein $R_2$, $R_3$, $R_4$ and $R_5$ are as defined above, $m$ is an integer from one to five inclusive, and $n$ is an integer from one to four inclusive, by reaction with up to 2.5 times $n$ equivalents of an oxidizing agent selected from the group consisting of periodic acid and lead tetraacetate per mole of said polyhydroxyalkylisoalloxazine to produce the corresponding [ω-formylalkyl]-isoalloxazine, and reacting the [ω-formylalkyl]-isoalloxazine thus-obtained with a carbonyl group reagent selected from the class consisting of hydrazines, semicarbazide, thiosemicarbazide and hydroxylamine.

21. A process for the preparation of a 6,7-di-lower-alkyl-9-formylmethylisoalloxazine which comprises reacting a 6,7-di-lower-alkyl-9-(glycityl)-isoalloxazine with up to 7.5 equivalents of periodic acid per mole of said 6,7-di-lower-alkyl-9-(glycityl)-isoalloxazine to produce a 6,7-di-lower-alkyl-9-formylmethylisoalloxazine.

22. A process for the preparation of 6,7-dimethyl-9-formylmethylisoalloxazine which comprises reacting one mole of a 6,7-dimethyl-9-(glycityl)-isoalloxazine with up to 7.5 equivalents of periodic acid per mole of said 6,7-dimethyl-9-(glycityl)-isoalloxazine to produce 6,7-dimethyl-9-formylmethylisoalloxazine.

23. A process for the preparation of 6,7-dimethyl-9-formylmethyl-isoalloxazine which comprises reacting one mole of a 6,7-dimethyl-9-(glycityl)-isoalloxazine with up to 7.5 equivalents of lead tetraacetate per mole of said 6,7-dimethyl-9-(glycityl)-isoalloxazine in an acid medium to produce 6,7-dimethyl-9-formylmethylisoalloxazine.

24. A process of preparing 6,7-dimethyl-9-formylmethylisoalloxazine comprising reacting 6,7-dimethyl-9-(1'-D-ribityl)-isoalloxazine with up to 7.5 equivalents of periodic acid per mole of 6-7-dimethyl-9-(1'-D-ribityl)-isoalloxazine to produce 6,7-dimethyl-9-formylmethylisoalloxazine.

25. A process of preparing 6,7-dimethyl-9-formylmethylisoalloxazine comprising the step of mixing one mole of 6,7-dimethyl-9-(1'-D-ribityl)-isoalloxazine with between 6.0 and 7.0 equivalents of lead tetraacetate and reacting the resulting mixture in an acid medium to produce 6,7-dimethyl-9-dimethyl-9-formylmethyl-isoalloxazine.

26. A process for the preparation of 6,7-dimethyl-9-[ω-formyl-ethyl]-isoalloxazine which comprises reacting 6,7-dimethyl-9-(1'-D-sorbityl)-isoalloxazine with up to 10.0 equivalents of periodic acid per mole of said 6,7-dimethyl-9-(1'-D-sorbityl)-isoalloxazine to produce 6,7,-dimethyl-9-[ω-formylethyl]-isoalloxazine.

27. Crystalline 6,7-dimethyl-9-formylmethylisoalloxazine monohydrate having a melting point of 258 to 259 degrees centigrade.

No references cited.